Oct. 28, 1941.  W. E. WHITE  2,260,962

DISPENSING PACKAGE FOR INDICATOR PAPER

Filed Oct. 14, 1939

INVENTOR.
WAYNE E. WHITE
BY Robert U. Geib, Jr.
ATTORNEY.

Patented Oct. 28, 1941

2,260,962

UNITED STATES PATENT OFFICE 2,260,962

DISPENSING PACKAGE FOR INDICATOR PAPER

Wayne E. White, Oakmont, Pa., assignor to Fisher Scientific Company, Pittsburgh, Pa.

Application October 14, 1939, Serial No. 299,484

1 Claim. (Cl. 206—52)

This invention relates to indicator paper, such as litmus paper, which is susceptible to change of color upon exposure to certain liquids and gases. Such indicator paper is used in laboratories and elsewhere for making tests according to which the operator may place a small piece of the said paper in contact with each of a large number of separate test liquids or gases. This either entails a large number of strips of indicator paper or the tearing off of smaller portions of a strip to provide the necessary number. The first case is objectionable because it necessitates the use of an inordinate number of strips of indicator paper, while the second case involves considerable trouble and waste of time. In either case the indicator paper must be maintained in a suitable container; for otherwise certain liquids or gaseous atmospheres may cause it to change color and thus become worthless for its intended purpose.

It is among the objects of the present invention to provide a novel dispensing package or container for indicator paper which not only enables the ready dispensing of the indicator paper in whatever length is desired, but one which at the same time precludes the possibility of exposure of the unused portion of the indicator paper to liquids, or gaseous atmospheres tending to make it change color.

Another object is to provide a device of the class described which may be easily and conveniently used with but one hand of the operator, thereby eliminating the difficulty attending the removal of a single piece of indicator paper from small bottles or vials.

Still another object is the provision of a dispensing package of the type referred to immediately hereinbefore which enables the ready inspection of the indicator paper disposed therein and also a similarly disposed color chart which is thus protected from damage.

Still another object is to provide a device of the class described which is inexpensive to manufacture and one which is, at the same time, of durable character.

The invention, then, comprises the features hereinafter fully described and as particularly pointed out in the claim, the following description and the annexed drawing setting forth in detail a certain illustrative embodiment of the invention, this being indicative of but one of a number of ways in which the principles of the invention may be employed.

Figure 1:
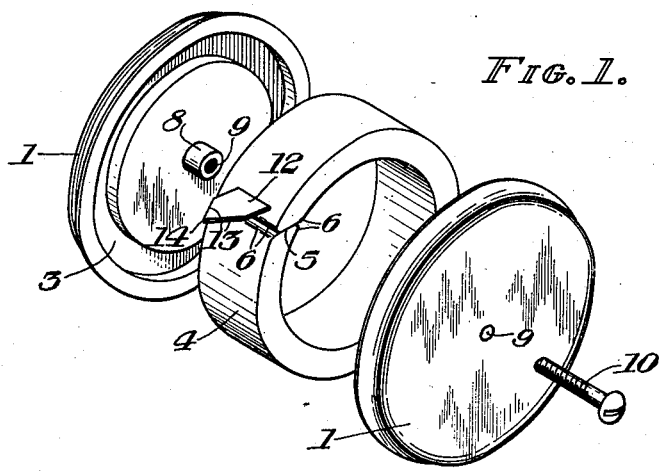
Figure 1 is an exploded perspective view of the device of the invention.

Referring more particularly to the drawing, the numeral 1 designates a pair of circular end plates which are adapted to hold between them the indicator paper and also a liquid-and-atmosphere-sealing instrumentality through which the paper may be dispensed. Preferably, the circular end plates 1 are formed either wholly or in part of transparent material, such as Celluloid, which thereby enables the inspection of the quantity of indicator paper within the dispensing package and also a color chart (not shown) which may also be disposed within the dispensing package and thereby be free from becoming soiled, stained or mutilated beyond its intended usefulness.

Figure 3:
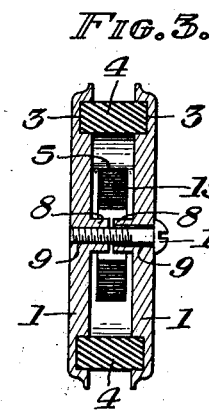
Figure 3 is a cross section.

More specifically, the outer faces of the end plates 1 are planar, while the inner, and therefore most adjacent, faces thereof are provided with opposed annular grooves, generally designated at 3. Referring particularly to Figure 3, it will be observed that the annular grooves 3 are defined by surfaces which comprise three sides of a rectangle.

Disposed between the end plates 1, and seated in the annular grooves 3 thereof, is an annular resilient sealing member 4 having a dispensing aperture 5 therein. The dispensing aperture or slot 5 is provided at each of its ends, and on either side thereof, with beveled portions 6, the function of which will appear more fully hereinafter.

Each of the end plates 1 is provided on its interior face and at its center with a foreshortened boss portion 8, both of which are apertured, as at 9, and one of which is screw threaded, whereby said boss portions may cooperatively receive between them a clamping screw 10.

Figure 4:
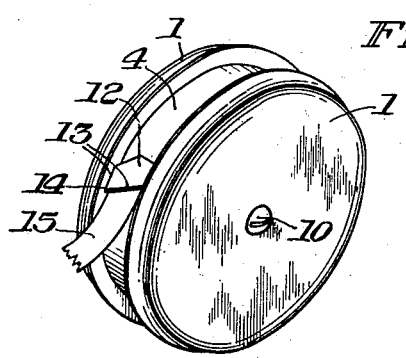
Figure 4 is a perspective of the device in completely assembled relationship.

Referring to Figure 4, it will be noted that the annular resilient sealing member 4 carries a cutting instrumentality in the form of a blade 12 which extends in parallelism with the dispensing aperture or slot 5 and on the side thereof which is away from the tangent of the roll of indicator paper which is placed between the end plates 1 and interiorly of the said sealing member. This cutting blade 12 is beveled, as at 13, to provide a point 14, the respective surfaces of these instrumentalities functioning to sever the indicator paper in a most efficient manner.

Figure 2:
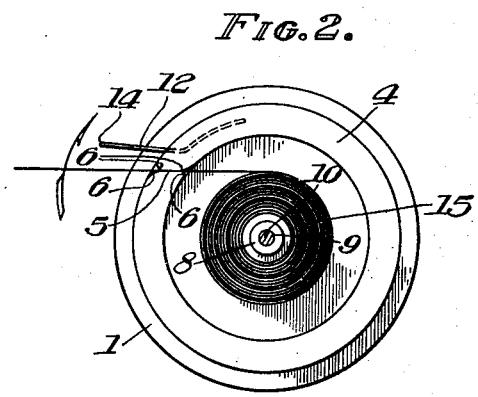
Figure 2 is an end elevation with one of the end plates removed.

Referring to Figures 1 and 2 of the drawing, the dispensing aperture or slot 5 forms the tangent of a circle which is concentric with the axis of turning of a roll, designated at 15, of indicator paper disposed within the package or container. The axis of the dispensing aperture or slot 5 is shown, in the present instance, as substantially intermediate the axis of turning of the roll 15 of indicator paper and the interior surface of the annular resilient sealing member 4. Such an arrangement permits the indicator paper to be withdrawn from the roll 15 without excessive deflection.

According to a preferred embodiment, the end plates 1 are composed of Celluloid or other transparent material, whereby they may carry on their interior faces color charts for comparison with the portions of the indicator paper which have been severed from the roll, designated at 15, and used for various tests.

It has been found in practice that the screw 10 may be easily and speedily adjusted to maintain the annular resilient sealing member 4 in proper clamped relationship between the end plates 1 to maintain the dispensing aperture sufficiently closed to prevent the ingress of liquid, or gaseous media while, at the same time, enabling the ready withdrawal of the indicator paper through said aperture.

While I have shown and described one specific embodiment of the present invention, it will be seen that I do not wish to be limited exactly thereto, since various modifications may be made without departing from the scope of the invention, as defined by the following claim.

I claim:

A package comprising a roll of indicator paper enclosed in a container, the indicator paper being characterized by susceptibility of change in color by certain liquid or gaseous media, said container comprising a pair of end closures, an intermediately disposed narrow relatively thick, substantially continuous band having a slot through which the indicator paper extends, said band being composed of edgewise compressible material, means carried by at least one of said end closures for preventing the radial displacement of said band, and means for clamping said end closures against said band with sufficient force to edgewise compress and thicken the material of the band and thereby tend to close the slot and thus cause the slot to embrace said paper sufficiently closely to prevent the ingress therebetween of liquid or gaseous media at atmospheric pressure, said band and end closures being constructed and arranged to exclude liquid or gaseous media at atmospheric pressure, whereby the change in color of the enclosed portion of said paper is prevented.

WAYNE E. WHITE.